United States Patent [19]

Kawata et al.

[11] 4,363,973
[45] Dec. 14, 1982

[54] SAFETY CIRCUIT OF AUTOMATIC TRANSMISSION CONTROL SYSTEM

[75] Inventors: Shoji Kawata, Okazaki; Tomoaki Nishimura, Toyota; Naoji Sakakibar, Chiryu; Nobuyuki Imai, Aichi; Hiroyuki Amano, Chiryu; Shigemitsu Hamajima, Obu, all of Japan

[73] Assignee: Aisin Seiki Kabushiki Kaisha, Kariya, Japan

[21] Appl. No.: 304,626

[22] Filed: Sep. 22, 1981

[30] Foreign Application Priority Data

Sep. 24, 1980 [JP] Japan .............................. 55-132640

[51] Int. Cl.$^3$ ............................................. H02G 3/00
[52] U.S. Cl. .................................. 307/10 R; 180/170
[58] Field of Search ............. 307/10 R; 180/170, 174, 180/176

[56] References Cited

U.S. PATENT DOCUMENTS

| 3,247,740 | 4/1966 | Shuster ........................ 180/170 X |
| 3,381,771 | 5/1968 | Granger et al. ..................... 180/176 |
| 3,455,411 | 7/1969 | Carp et al. ........................... 180/176 |
| 3,983,405 | 9/1976 | Donovan .......................... 307/10 R |

Primary Examiner—Donald A. Griffin
Attorney, Agent, or Firm—Burns, Doane, Swecker & Mathis

[57] ABSTRACT

A safety circuit in an automatic transmission control system having a comparator producing a transmission shifting control signal wherein upon comparing a vehicular velocity responsive signal and a throttle opening responsive signal, the safety circuit comprises:

a comparator whose inverting input terminal is supplied with the vehicular velocity responsive signal through a capacitor and whose non-inverting input terminal is supplied with a constant voltage signal which is lower than the inverting terminal signal at normal state, the comparator detecting the difference between the two input voltages;

a transistor circuit for connecting to ground said transmission shifting control signal; and a latching circuit for latching the output signal of the transistor circuit, whereby an abrupt loss of the vehicluar velocity responsive signal is detected.

6 Claims, 8 Drawing Figures

SAFETY CIRCUIT OF AUTOMATIC TRANSMISSION CONTROL SYSTEM

BACKGROUND

This invention relates to a safety circuit in the automatic transmission control system of a vehicle. More particularly, the invention relates to a safety circuit for use with an automatic transmission control system of the type having a control circuit which receives a first input signal responsive to the vehicular velocity and a second input signal with which the first input signal is compared to determine a speed change point, and which then produces a speed change or shifting control signal that is delivered to a transmission shifting control circuit; and the safety circuit operates in response to a failure such as interruption or loss of the signal responsive to the vehicular velocity.

Conventional automatic transmission control systems come equipped with a control circuit which receives a signal responsive to the vehicular velocity as well as a signal corresponding to the output torque of the engine or a signal responsive to the size of the throttle opening, and which, upon comparing the two input signals, produces a shifting control signal that causes the vehicle transmission to shift the transmission ratio ("gear ratio" hereinafter). The signal responsive to the velocity of the vehicle may be supplied by a well-known reed switch type of vehicular velocity sensor which is adapted to sense the rotational speed (rpm) of the drive shaft. This type of vehicular velocity sensor has a constant voltage applied across both its terminals and is opened and closed by a magnet that rotates in accordance with the revolution of the drive shaft, thereby producing constant voltage pulses at a frequency which is in accordance with the drive shaft rpm. Ordinarily, the vehicular velocity sensor is incorporated within a speedometer, and is adapted to sense the rotational speed of the transmission output shaft as the corresponding rotational speed of the speedometer cable, and to produce the vehicular velocity responsive signal, in the form of the constant-voltage pulses, at the same time that the speedometer indicates the velocity of the vehicle.

Failures which can develop in the foregoing system for sensing and transmitting the signal responsive to vehicular velocity include breakage of the speedometer cable, a malfunction in the gear train for transmitting the rotational speed, a malfunction in the vehicular velocity sensing reed switch per se, or severance of the wiring that carries the output signal from the vehicular velocity sensor. In general, failures of the aforementioned type bring about an interruption in the vehicular velocity responsive signal. In such cases, the output signal acquired from the velocity sensor ordinarily is similar to that obtained when the vehicle is at rest. For example, in a case where one end of the reed switch is connected to body ground and the other end is connected to a positive constant-voltage line, a failure in the reed switch gives rise to a discontinuity in the train of constant-voltage pulses, i.e., a continuous non-pulse signal, and the resulting output signal resembles that produced when the vehicle is at rest. The same signal will be produced as a result of any of the failures described above. The control circuit of the automatic transmission control system would interpret such a signal as indicating that the vehicle is at rest and would send a control signal to the transmission to effect a down-shift to, say, the first gear ratio. While this may not pose a major problem when the vehicle is travelling at a low velocity, the abrupt down-shift to the first gear ratio, should it occur during a high vehicular velocity, would give rise to violent and unexpected engine braking that could subject the driver and passengers to a shock and lead to transmission or engine failure as well. Conventional failure detection and safety devices for precluding the foregoing mishap entail special circuit configurations and detection mechanisms and therefore tend to be complicated and expensive.

SUMMARY OF THE INVENTION

Accordingly, an object of the present invention is to provide a simple, reliable and inexpensive safety circuit for the control circuit of an automatic transmission control system, which safety circuit precludes the hazardous situation described above.

To this end, the present invention provides a safety circuit for use in an automatic transmission control system of the aforementioned type, which safety circuit comprises a comparator circuit having an inverting input terminal which is connected through a capacitor to a terminal for delivering, as an output signal, the signal responsive to the velocity of the vehicle as acquired from the control circuit means, and which is connected through a resistor to a first constant voltage terminal, and a non-inverting input terminal which is connected to a second constant voltage terminal of a constant voltage which is lower than that of the first constant voltage terminal to which the inverted input terminal is connected, the comparator detecting the difference between the two input voltages applied thereto, a transistor circuit, biased by the output of the comparator, for connecting to ground an output terminal that delivers the transmission shifting control signal of the control circuit means when in the conductive state, and a circuit means for keeping the output terminal connected to ground through a self-holding action, an abrupt interruption or loss of the signal responsive to the velocity of the vehicle being detected to place the transmission shifting control signal in a state that shifts the vehicle to a high speed gear ratio, and to hold the transmission shifting signal in that state through a self-holding action.

DETAILED DESCRIPTION OF THE INVENTION

The present invention will now be described in conjunction with an embodiment thereof, which, however, is disclosed for better illustration and not for limitation of the invention, and modifications from the embodiment can be made without departing from the gist thereof.

Figure 1A:
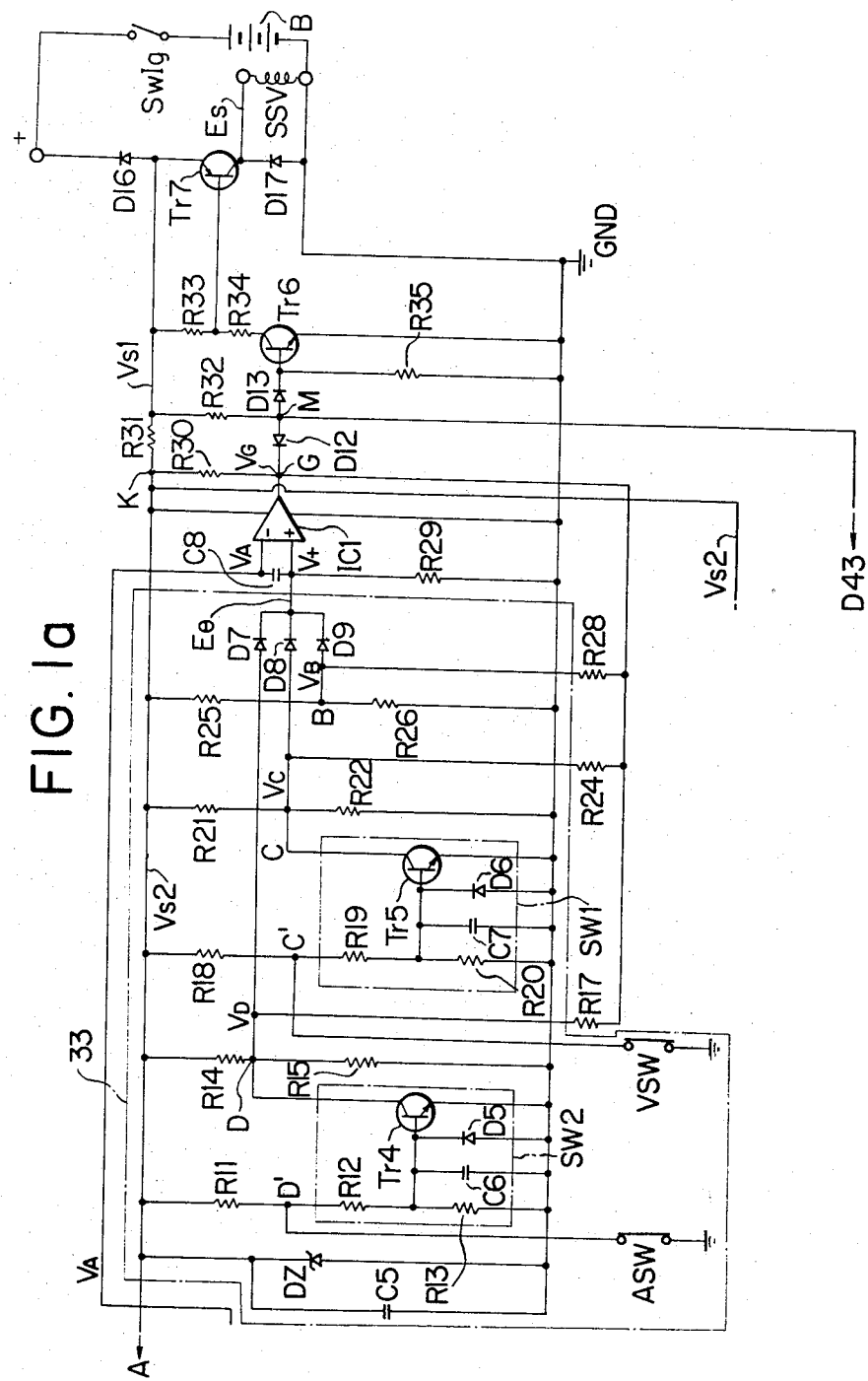
FIG. 1 is a schematic circuit diagram of a speed control circuit and automatic transmission control system constructed in accordance with the present invention.
Figure 1B:
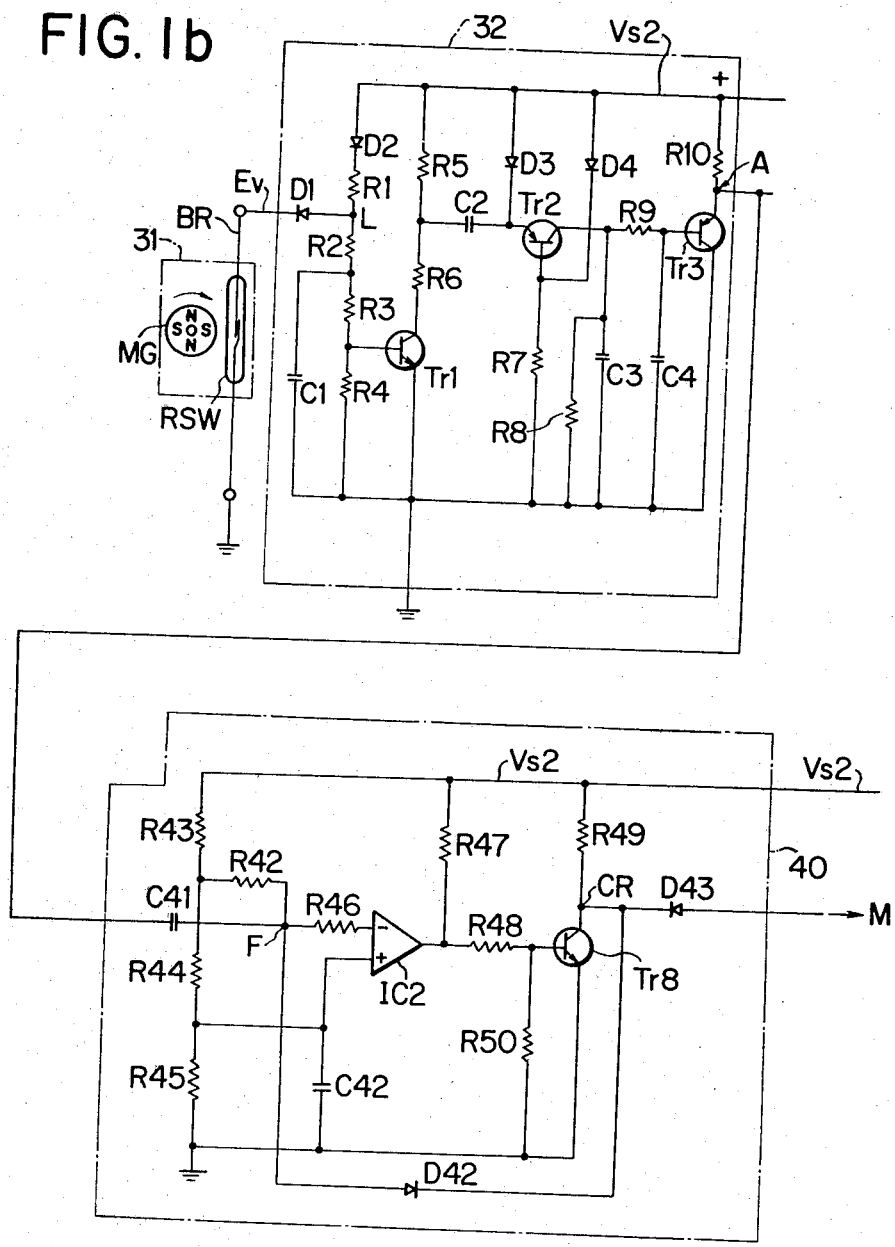

FIG. 1 illustrates the control circuit and safety circuit of an automatic transmission system embodying the present invention.

Figure 2:
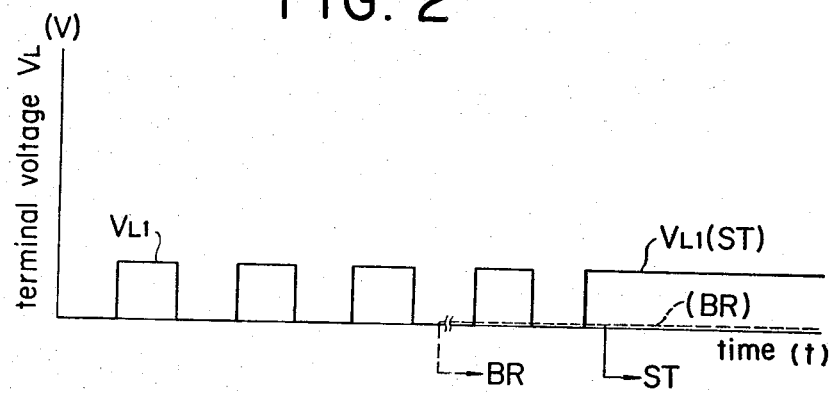
FIG. 2 is a graph showing, in general terms, the relation between time and the terminal voltage at terminal L in FIG. 1.

In FIG. 1, the reed switch RSW of a reed switch vehicular velocity sensor 31 has its plus side connected to the input terminal of a frequency-to-voltage (FV) converter, generally denoted 32, constituting part of the control circuit, and has its minus side grounded to the vehicle body. The sensor 31 includes a magnet MG which is rotated through a speedometer cable that transmits the rotary motion of the transmission output shaft or drive shaft to a speedometer. Thus the magnet MG rotates at a speed which corresponds to that of the output shaft or drive shaft. The reed switch RSW, by reason of the rotating magent MG, opens and closes at a frequency which is responsive to the velocity of the vehicle thereby producing a vehicular velocity responsive "signal" $E_v$ as an output. In the illustrated circuit configuration, the reed switch RSW is connected in parallel with resistors R2, R3 and R4 that in turn form a series connection or voltage dividing circuit with a resistor R1 connected to a supply voltage line VS2. According to this arrangement, the output produced by the sensor 31 is transmitted from the input terminal of the FV converter 32 to a terminal L through a diode D1, producing constant voltage pulses VL1, as shown in FIG. 2, when the vehicle is moving. As shown in FIG. 2, when the vehicle comes to a halt when the reed switch RSW is open, as at time ST, the output of the sensor 31 causes a continuous waveform $V_{L1}$ (ST) to be produced, having the value of the constant voltage determined by the voltage dividing circuit and the supply voltage. If the vehicle stops between the pulses $V_{L1}$, when the reed switch RSW is closed, the output of the sensor will become a continuous signal of zero volt. As will later be described, when a signal responsive to the vehicular velocity indicates that the velocity is zero (vehicle at rest), a transmission shifting signal is produced that shifts the transmission into the first gear ratio (i.e., into a low speed gear ratio).

The control circuit of the embodiment shown in FIG. 1 includes, in addition to the FV converter circuit 32 for converting a vehicular velocity responsive signal $E_v$; a circuit, generally denoted 33, for forming a signal $E_\theta$ which corresponds to engine output torque or to the degree of the throttle opening; a comparator $IC_1$ for comparing the vehicular velocity responsive signal $E_v$ and the output torque corresondance signal $E_\theta$ and producing an output signal $V_6$ in dependence on the comparison, and additional circuitry comprising essentially a hysteresis circuit that applies the output signal $V_G$ of the comparator $IC_1$ as positive feedback to the $E_\theta$ signal forming circuit 33 through resistor R17, R24 or R25 for converting the output signal $V_G$ of the comparator $IC_1$ into a signal Es for shifting control means (a shifting solenoid vlave SSV that will be described later) adapted to shift the gear ratio in the vehicle transmission.

The circuit 33 for forming the signal $E_\theta$ that corresponds to the output torque has an OR circuit composed of diodes D7, D8, D9 on the output side for selectively supplying the comparator $IC_1$ with signal voltages $V_B$, $V_C$, $V_D$, corresponding to three ranges of throttle opening. These signal voltages $V_B$, $V_C$, $V_D$ appear at voltage divider terminals B, C, D, respectively, formed by resistor pairs R25 and R26, R21 and R22, and R14 and R15, respectively, which divide the voltage developed between a ground terminal and supply voltage line VS2. However, since each potential divider is connected to the output terminal G of the comparator $IC_1$ through respective ones of the resistors R17, R24, R28 in a positive feedback configuration, the voltages $V_B$, $V_C$, $V_D$ at the potential divider terminals are limited in magnitude by resistor triads R25, R26, R28; R21, R22, R24; R14, R15, R17; respectively, in such a manner as to establish the inequality $V_B < V_C < V_D$. Thus, the signal voltage which the OR circuit of the circuit 33 delivers to the comparator is one of the voltages $V_B$, $V_C$, $V_D$ which are related by the above inequality and which correspond to the three different ranges of throttle opening.

Of the terminals B, C, and D that deliver the three voltages responsive to the three throttle openings, the terminal B is merely connected to ground through the resistor 26. The terminal C, on the other hand, which corresponds to the second range of throttle opening, is connected to ground through a switching circuit $SW_1$, comprising a transistor Tr5, which shunts the terminal C to ground when the transistor conducts. The switching circuit $SW_1$ has a bias voltage input terminal C' which is grounded through a throttle opening sensing switch VSW (such as a vacuum switch for sensing a negative pressure in the engine intake system), and which is connected also to the constant-voltage (supply voltage) line (referred to as the plus side hereafter) VS2 through a resistor R18. The terminal D likewise is connected to ground through a switching circuit $SW_2$, comprising a transistor Tr4, which functions in the same manner as switching circuit $SW_1$. The switching circuit $SW_2$ has a bias voltage input terminal D' which is grounded through another throttle opening sensing switch ASW (such as an accelerator position sensing switch or a switch of the same type as the switch VSW but having a different operating point), and which is connected also to the plus side VS2 through the resistor R11. A reverse connected Zener diode DZ connects the plus side VS2 of the circuit 33 to ground and is itself connected in parallel with a capacitor C5.

In the switching circuit $SW_1$, the transistor Tr5, which is of the npn-type, has its emitter connected to ground and its collector connected to the potential divider terminal C. The base of transistor Tr5 is grounded through a parallel circuit arrangement consisting of a reverse connected diode D6, a capacitor C7 and a resistor R20, and is further connected to the plus side VS2 through a resistor R19, the terminal C' and a resistor R18. In the switching circuit SW2, the transistor Tr4, which is of the npn-type, has its collector connected to the potential divider terminal D, its emitter grounded, and its base connected to the plus side VS2 through the terminal D' and a resistor R11, as well as to ground through a parallel arrangement consisting of a diode D5, a capacitor C6 and a resistor R13.

The FV converter circuit 32 can make use of known circuitry. An exemplary embodiment of the FV converter circuit is shown in FIG. 1 and comprises transistors Tr1 through Tr3, diodes D1 through D4, resistors R1 through R10, and capacitors C1 through C4 connected as shown to form wave-shaping, differentiating, integrating and buffer circuits connected in that order between the signal input and signal output terminals of the converter circuit. The output terminal comprises the emitter terminal A of the transistor Tr3, which is an npn-type buffer transistor having its collector grounded, and its emitter connected via a resistor R10 to the plus side $VS_2$, which is the common side of the control circuit. The negative side of the FV converter terminal 32 is grounded to the vehicle body. The plus terminal (output terminal) of the reed switch in the vehicle speed sensor 31 is connected to the diode D1 of the FV converter circuit 32, the connection being effected at the diode input terminal which serves as the input terminal to the FV converter circuit.

The output terminal A of the FV converter circuit 32 is also connected to the inverting input terminal(−) of the comparator $IC_1$ and to the non-inverting input terminal(+) of the comparator through a capacitor C8. The non-inverting input terminal of the comparator $IC_1$ is in turn connected to the output terminal of the OR circuit (the diodes D7 through D9) of the circuit 33 and to ground through a resistor R29. Power is supplied to the comparator $IC_1$ by connecting it between the plus side $VS_2$ of the control circuit and ground.

The output terminal G of the comparator $IC_1$ is connected to the plus side $VS_2$ which constitutes a (second plus side) through a resistor R30, and the second plus side $VS_2$ is series-connected to a supply voltage line constituting a first plus side $VS_1$ through a resistor $R_{31}$. A diode D12 and resistor R32, connected in parallel with the resistor R30 and resistor R31, also are connected to the first plus side $VS_1$, as shown.

The second plus side or constant-voltage supply voltage line $VS_2$ is connected to the output terminal K of the resistor R31. The first plus side or supply voltage line $VS_1$ is connected to a positive constant-voltage source (battery B described hereinbelow) through a diode D16. An npn-type transistor Tr6 has its collector terminal connected to the first plus side $Vs_1$, which is connected to the output side of the diode D16, through serially connected resistors R33, R34. The emitter terminal of transistor Tr6 is connected to ground, and its base terminal is connected via a diode D13 to a terminal M defining the junction of the resistor R32 and the diode D12. The base terminal of transistor Tr6 is connected also to ground through a resistor R35, and the collector terminal is further connected to the base terminal of a pnp-type transistor Tr7 through the resistor R34. The emitter terminal of transistor Tr7 is connected to the first plus side $VS_1$. A parallel arrangement of a diode D17 and the coil of a shifting solenoid valve SSV is connected at one end to the collector terminal of transistor Tr7 and is connected at the other end to ground. A battery B has a positive terminal which is connected to the positive terminal on the first plus side $VS_1$ through an ignition switch SWIg, and a negative terminal which is grounded.

Figure 4:
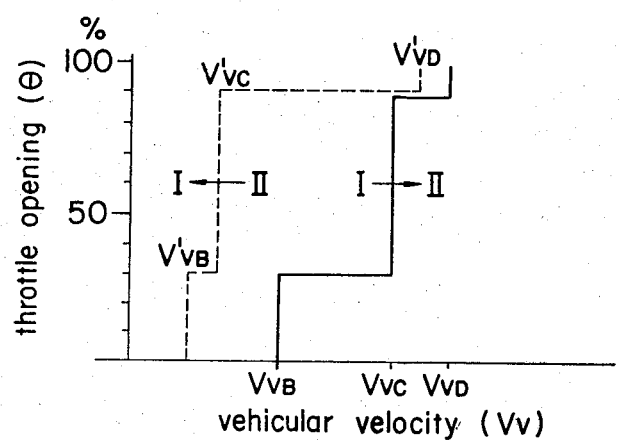
FIG. 4 is a shifting characteristic curve according to an embodiment of the present invention.
Figure 5:
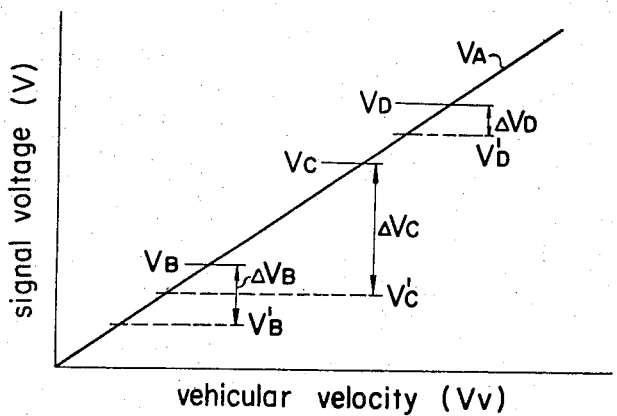
FIG. 5 is a graph showing how hysteresis, vehicular velocity $V_V$ and signal voltage are related.
Figure 6:
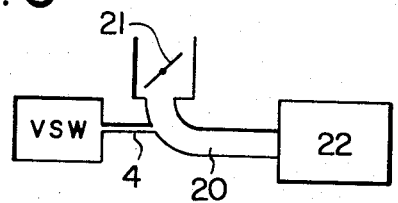
FIG. 6 is a schematic view of apparatus for sensing negative pressure in an engine intake system.

The embodiment of the control circuit of the present invention described above operates in the following manner. It should first be noted that, in the illustrated embodiment, the throttle opening sensing switch VSW employs a negative-pressure responsive switch which, as shown in FIG. 6, communicates via a connecting tube 4 with an engine intake pipe 20 connected between a throttle valve 21 and intake manifold 22, and that the throttle opening sensing switch ASW makes use of an accelerator position sensing switch which is not shown. These switches can, however, rely upon different throttle sensing means. Illustrated in FIG. 4 is a shifting characteristic obtained by applying the control circuit shown in FIG. 1.

The signal $E_V$, which is responsive to the vehicular velocity, is supplied to the FV converter circuit 32 by the velocity sensor 31 in the form of a pulsed frequency signal. The FV converter circuit 32 converts the signal $E_V$ into a voltage signal $V_A$ which corresponds to the vehicular velocity $V_V$. The voltage $V_A$ appearing at the output terminal A of the circuit is fed to the inverting input terminal (−) of the comparator $IC_1$. Meanwhile, the negative pressure responsive switch VSW in the intake system 20 is either opened or closed in response to the throttle opening angle $\theta$. That is, the switch VSW is closed or opened when the negative pressure in the intake system is larger or smaller, respectively, than a preset pressure, and functions to open or close, respectively, the switching circuit $SW_1$ comprising the transistor Tr5. The accelerator position sensing switch ASW (which alternatively can be a negative-pressure responsive switch if desired) is closed for an accelerator opening of 90 degrees, thereby opening the switching circuit $SW_2$ comprising the transistor Tr4. The switching circuits $Sw_1$ and $SW_2$ connect the plus side $VS_2$ to ground through the resistors R21 and R14, respectively, when they are closed. When switching circuit $SW_1$ is open, the prescribed voltage $V_C$ appears at terminal C, and when the switching circuit $SW_2$ is open, the prescribed voltage $V_D$ appears at terminal D. The voltage $V_B$, on the other hand, appears at terminal B owing to the voltage dividing action of the resistors R25 and R26 connected between the plus side $VS_2$ and ground. The voltage $V_B$, $V_C$, $V_D$ correspond to three successive ranges of throttle opening $\theta$. For example, $V_B$ may correspond to a range $0 \leq \theta < 30\%$, $V_C$ to a range of $30 \leq \theta < 90\%$, and $V_D$ to a range of $\theta \geq 90\%$. See FIG. 4 in this connection. The voltages $V_B$, $V_C$, $V_D$ are applied to the non-inverting input terminal (+) of the comparator $IC_1$ through the OR circuit comprising the diodes D7, D8, D9.

The voltage $V_A$ responsive to vehicular velocity is fed to the inverting input terminal (−) of comparator $IC_1$, as set forth above, while a voltage V+ (corresponding to $E_\theta$) is impressed upon the non-inverting input terminal of the comparator. Depending upon the magnitudes of these two inputs, the voltage $V_G$ appearing at the output terminal G of the comparator $IC_1$ is a high-level signal (for $V_A < V+$), or a low-level signal (for $V_A > V+$). The transistor Tr6, acting as a switch, is open when the voltage $V_G$ at terminal G is high and closed when it is low. When transistor Tr6 is conducting, transistor Tr7 is turned ON to connect the solenoid valve SSV to plus side $VS_2$ thereby energizing the solenoid. When transistor Tr6 is not conducting, transistor Tr7 is cut off and disconnects the solenoid valve SSV from plus side $VS_2$, thereby de-energizing the solenoid. Thus, the solenoid valve SSV, which constitutes shifting control means for shifting the gear ratio in the transmission, is supplied with a prescribed energizing voltage according to the state, either conductive or nonconductive, of the transistor Tr7. The transmission is shifted, ordinarily by means of hydraulic pressure, into the first gear ratio (low velocity range) when the solenoid valve SSV is energized, and into the second gear ratio (high velocity range) when the solenoid valve SSV is deenergized. The signal voltages $V_B$, $V_C$, $V_D$, corresponding to the three ranges of throttle opening, decide the point at which the shift from the first to second gear ratio is executed. It will be appreciated that only one of these signal voltages is present at any one time. When the signal voltage $V_A$ sent to the negative input terminal of the comprator $IC_1$ from the FV converter circuit 32 is greater than the signal voltage ($V_B$, $V_C$ or $V_D$) passed by the OR circuit to the positive input terminal of the comparator (that is, at such time that the voltage value indicative of the vehicle velocity $V_A$ is greater than the voltage value indicative of the shift point corresponding to the prescribed throttle opening), an up-shift operation is executed from the first to the second gear ratio. In other words, each of the vehicular velocities $V_{VB}$, $V_{VC}$, $V_{VD}$ at the shift points corresponding to $V_B$, $V_C$, $V_D$ is as illustrated in FIG. 4.

Once the voltage $V_A$ has exceeded the particular input voltage, for example, the voltage $V_B$, at the positive terminal of the comparator $IC_1$ (i.e., with solenoid valve, SSV deenergized, and the vehicle operating in the second gear ratio the output voltage $V_G$ at the output terminal G of the comparator drops to the low level. The voltage $V_B$ at terminal B has, up until this time (i.e., during the presence of the high level at terminal G), been the result of a voltage dividing action due to the parallel resistors R25 and R28 connected between the terminal B and the plus side VS$_2$ and the resistor 26 connected between the terminal B and ground. When voltage $V_6$ goes to zero, however terminal B is connected to ground through a circuit comprising the parallel resistors R26, R28. As a result, a potential $V'_B$ appears at terminal B, which potential is smaller than $V_B$ (i.e., $V'_B < V_B$). A similar relation holds true with regard to terminal C because of resistors R21, R22 and R24, and with regard to terminal D because of resistors R14, R15 and R17. Thus, whenever the voltage $V_A$ exceeds the preset voltage $V_B$, $V_C$ or $V_D$ (up-shift from first to second gear ratio), $V_B$ falls to $V'_B$, $V_C$ to $V'_C$, and $V_D$ to $V'_D$, so that the shift point from the second back to the first gear ratio now occurs at a lower vehicle velocity than the shift from the first to the second gear ratio. Accordingly, a difference in the vehicular velocity (which difference is a form of hysteresis) at the two shift points for up-shifting and down-shifting is defined by the electrical hysteresis created by the differences in the voltages $V_B$, $V_C$, $V_D$ at the terminals B, C, D. Specifically, this electrical hysteresis is specified by $\Delta V_B = V_B - V'_B$, $\Delta V_C = V_C - V'_C$ $\Delta V_D = V_D - V'_D$.

The desired magnitude or "width" of the abovementioned hysteresis is determined in dependence on the characteristics of the transmission, the type of vehicle, the desired speed change characteristics and the like. In the present invention, the hysteresis setting is readily accomplished by a suitable combination of, for example, the resistors R25, R26, and R28 in the case of voltage $V_B$. It is required, however, that the hysteresis at least be large enough to preclude chattering.

It has been mentioned above that the vehicle operates in the first gear ratio when the shifting solenoid is energized and is shifted into the second gear ratio when the solenoid is deenergized. Such an arrangement is adopted because a greater degree of safety is achieved by having the solenoid remain in the deenergized state when the vehicle is travelling, particularly at a constant high speed.

It should also be noted that while the illustrated embodiment relies upon just two shifts in speed (first and second gears), a speed change pattern is possible in which a number of such speed changes can be accomplished using the same principle.

Although the control circuit in the illustrated embodiment establishes hysteresis by means of the special technique described hereinabove, the safety device of the present invention is applicable also to control circuits that employ known methods of establishing hysteresis, such as by changing the gradient of the FV converter gain to increase $V_A$ to $V_A'$. Furthermore, a well-known arrangement having a potentiometer linked to a throttle valve may serve as the circuit 33 for forming the signals that correspond to the engine output torque. It will be apparent to those of ordinary skill in the art that control circuits using such an arrangement can be employed in the present invention with a minor modification of a supplementary nature.

The safety circuit of the present invention will now be described in detail.

The safety circuit, denoted at numeral 40 in FIG. 1, includes a capacitor C41 having one terminal connected to the output terminal A of the FV converter circuit 32 and the other terminal connected to a terminal F which, under normal conditions, is supplied with a constant voltage via a resistor R42 from a voltage dividing point defined by the junction of a resistor R43 and series-connected resistors R44 and R45, these resistors functioning to divide the voltage provided by the second plus side VS$_2$. The terminal F is in turn connected to the inverting input terminal (−) of a comparator IC$_2$ through a resistor R46, and to the collector terminal CR of an npn-type transistor Tr8 through a forward-connected diode D42. The collector terminal CR is connected to the plus side VS$_2$ through a resistor R49, and to the terminal M of the control circuit through a reverse-connected diode D43. It will be apparent from the foregoing that the circuit arrangement constitutes a "self-holding" or latch circuit which will maintain the state that exists following the operation of the comparator IC$_2$.

The non-inverting input terminal (positive input terminal) of the comparator IC$_2$ is connected to a voltage dividing point which is in turn connected to the plus side VS$_2$ through the serially connected resistors R43, R44, and to ground through the resistor R45, such that the non-inverting terminal is supplied with a constant voltage. The output terminal of comparator IC$_2$ is connected to the plus side VS$_2$ through a resistor R47, and to the base terminal of transistor Tr8 through a resistor R48. The base terminal of transistor Tr8 is further connected to ground through a resistor R50. This arrangement forms a bias circuit. The emitter terminal of transistor Tr8 is grounded, and its collector terminal CR is, as mentioned above, connected via the diode D43 to the terminal M in the shifting control system for shifting the transmission, the terminal M being coupled to the output terminal G of the control circuit comparator IC$_1$ through the diode D12.

The abovementioned resistors R43, R47, R49 are connected in parallel with one another and to the plus side VS$_2$ of the control circuit. To prevent noise the positive terminal of comparator IC$_2$ preferably is grounded through a capacitor C42, as shown.

The safety circuit of the foregoing configuration operates in the following manner.

Figure 7:
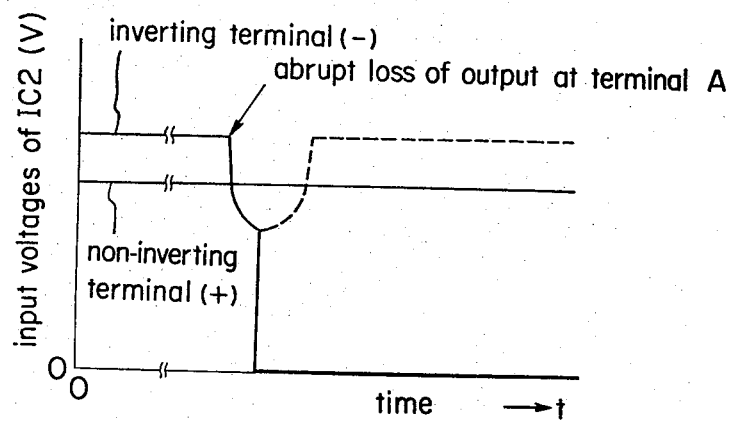
FIG. 7 is a graph of input signals to the non-inverting and inverting terminals of a comparator in the safety circuit of the present invention.
Figure 3:
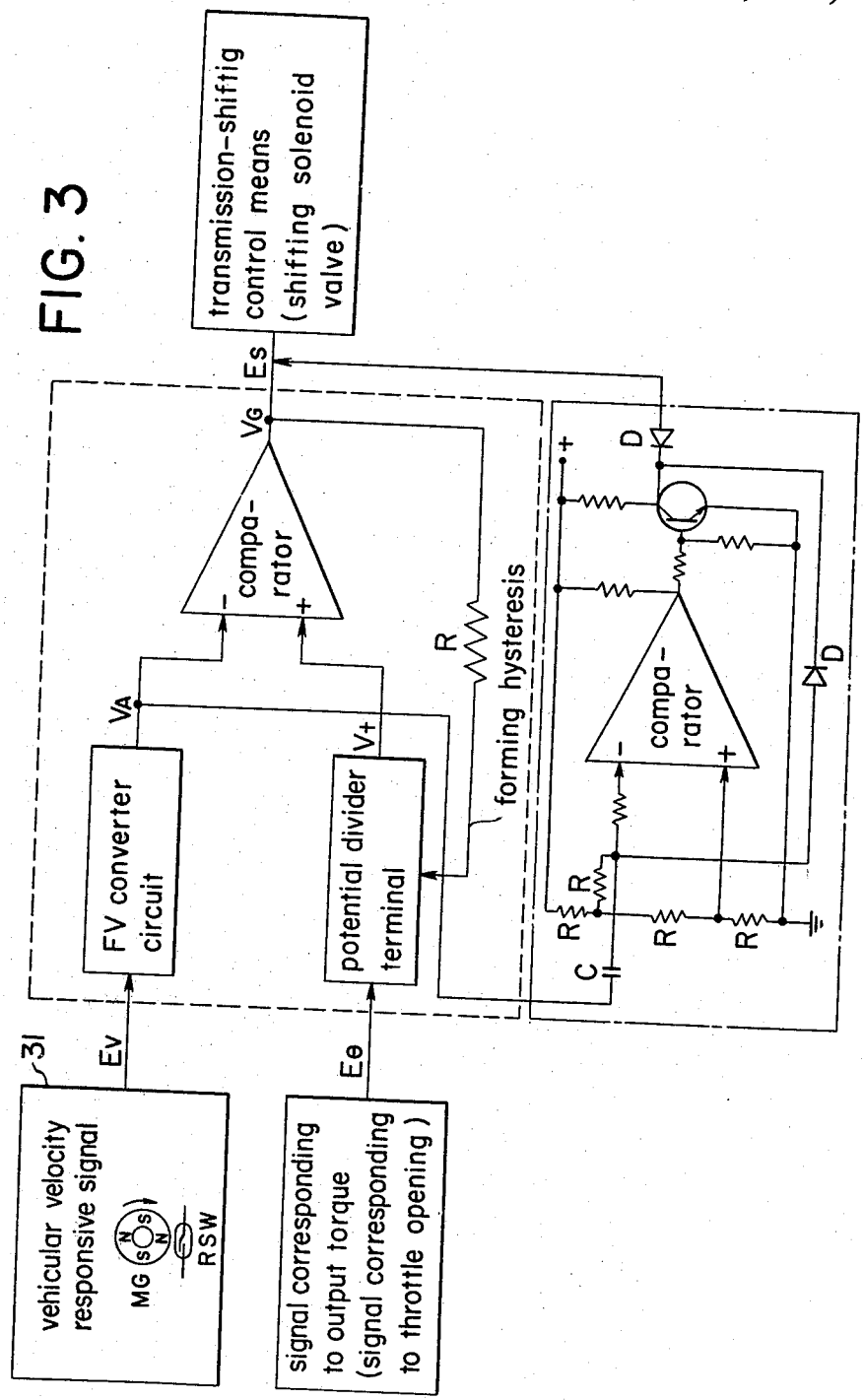
FIG. 3 is a block diagram illustrating an embodiment of the present invention.

The non-inverting terminal (+) of the comparator IC$_2$ receives a constant voltage owing to the potential dividing action of the resistors R43, R44; and R45. At the same time, the inverting terminal (−) of the comparator receives a constant voltage which is slightly higher than that being received at the non-inverting terminal (+) and which, under normal conditions, basically depends upon the divided voltage present at the junction between resistor R44 and R45. The voltage at the inverting input terminal (−) of comparator IC2 is held at a constant value as long as there is no abrupt change in the signal voltage $V_A$ (at terminal A) which is responsive to the vehicle velocity. Under normal conditions (no abrupt change in $V_A$) the output terminal of comparator IC2 is at a low level, the output terminal CR of transistor Tr8 is at a high level, and the terminal M of the control circuit is not influenced by the safety circuit 40 owing to the action of diode D43. Assume now that a failure occurs which leads to the loss of the vehicular velocity responsive signal $V_A$, which failure can be severance of the speedometer cable, a malfunction in the reed switch RSW of the vehicular velocity sensor 31, breakage of the wire connecting the reed switch RSW to the FV converter circuit 32, which has been indicated at point BR, or the like. In the event of such failure the voltage at terminal F in the safety circuit 40 experiences an abrupt change, namely an abrupt drop in value, as shown in FIG. 7, owing to the action of capacitor C41 and resistor R42. Consequently, the difference between the voltages at the inverting and non-inverting input terminals of the comparator IC2 swings in the opposite direction so that the output terminal of the comparator goes high. This causes transistor Tr8 to conduct so that its collector terminal CR is now shunted to ground, and the collector terminal voltage drops to the low level. A current therefore flows forwardly through the diode D43 which is thus shorted to ground through the conductive transistor Tr8. In this manner the voltage at terminal M of the control circuit drops to the low level, transistor Tr6 begins conducting and transistor Tr7 is cut off, thereby de-energizing the solenoid valve SSV. As a result, the vehicle is, in general, shifted to a higher speed gear ratio which, in the illustrated embodiment, is the second gear ratio. Since the collector terminal CR of transistor Tr8 is connected to terminal F on the negative side of capacitor C41 through the reverse connected diode D42, the terminal F is grounded through the collector terminal CR and the conductive transistor Tr8, this state being maintained owing to the latching action mentioned above. Terminal M, therefore, continues to be held at the low level. This means that the transmission will remain in the second gear ratio, which is significant because it prevents a violent decelerative shock and transmission damage that might otherwise be caused by an abrupt down-shift to the first gear ratio resulting from a failure, particularly at a high vehicular speed. Since the vehicle continues to operate in the second gear ratio owing to the latching action, the driver will become aware of the failure by noticing a deterioration in acceleration performance, particularly when starting off following a full-stop, when climbing an ascent, or when abrupt acceleration is required.

In the absence of the safety circuit described above, the loss of the vehicular responsive voltage $V_A$ would indicate, falsely, that the vehicular velocity $V_V$ is zero, i.e., that the vehicle is at rest or just starting off. Such an indication would, in general, cause the solenoid valve SSV to throw the vehicle into the first gear ratio, an action that would invite a variety of hazards.

It will be appreciated that the safety circuit of the present invention can be adapted to a control circuit of a different type, wherein the means for shifting an automatic transmission is controlled by the output signal of a comparator (IC1), one of whose inputs is the signal responsive to the vehicular velocity. The safety circuit of the present invention even allows a control circuit adapted for a shifting pattern of three or more gear ratio ranges to exhibit a self-holding action wherein the transmission would be shifted to the higher speed gear ratio and held there following the detection of a failure.

An alarm circuit can easily be connected to the safety circuit and adapted to issue a warning display or an audible alarm to inform the driver of a failure. The driver so informed of the failure in the automatic transmission control system could then switch over to manual operation and continue to drive the vehicle in a safe manner even following the failure.

We claim:

1. A safety circuit for use in an automatic transmission control system having a control circuit for receiving a first input signal which is responsive to the velocity of a vehicle and a second input signal which corresponds to the output torque of the vehicle engine or to the throttle opening of the vehicle engine, and for producing a transmission shifting control signal upon comparing the first and second input signals, said safety circuit comprising:

comparator means having a first input which is connected to said first input signal and which is connected to a first constant voltage, and a second input which is connected to a second constant voltage which is lower than said first constant voltage, said comparator detecting the difference between the two input voltages applied thereto and producing an output in response to an abrupt loss of said first input signal;

switch means responsive to the output of said comparator for controlling the transmission shifting control signal such that the vehicle transmission is shifted to a high speed gear ratio.

2. The safety circuit means as defined in claim 1, wherein said transmission shifting control signal produces the high speed gear ratio at its low level state.

3. The safety circuit as defined in claim 1 further comprising latch means for maintaining said switch means in the transmission shifting control signal controlling state.

4. The safety circuit as defined in claim 3, wherein said latch means comprises circuit means for connecting to ground said first input signal through said switch means.

5. The safety circuit as defined in claim 4, wherein said first input is connected to said switch means via a diode.

6. The safety circuit of claim 3 wherein said first comparator input is an inverting input and said second input is a non-inverting input, said first input signal is connected to said first comparator input via a capacitor, said first input is connected to said first constant voltage via a resistor, said second constant voltage is lower than said first constant voltage, and said switch means comprises transistor switch means for connecting said transmission shifting control signal to ground.

* * * * *

UNITED STATES PATENT AND TRADEMARK OFFICE
CERTIFICATE OF CORRECTION

PATENT NO. : 4,363,973

DATED : December 14, 1982

INVENTOR(S) : Shoji Kawata, Tomoaki Nishimura, Naoji Sakakibara, Nobuyuki Imai, Hiroyuki Amano, Shigemitsu Hamajima It is certified that error appears in the above—identified patent and that said Letters Patent is hereby corrected as shown below:

Title page, item [75], correct the last name of the third joint inventor to read -- Sakakibara --.

Signed and Sealed this

Twenty-second Day of March 1983

[SEAL]

Attest:

GERALD J. MOSSINGHOFF

*Attesting Officer*  *Commissioner of Patents and Trademarks*